(12) United States Patent  (10) Patent No.: US 8,800,382 B2
Bennett  (45) Date of Patent: *Aug. 12, 2014

(54) LOAD INDICATOR

(75) Inventor: Ian Robert Bennett, Cheltenham (GB)

(73) Assignee: Messier-Dowty Limited, Gloucester (GB)

( * ) Notice: Subject to any disclaimer, the term of this patent is extended or adjusted under 35 U.S.C. 154(b) by 576 days.

This patent is subject to a terminal disclaimer.

(21) Appl. No.: 13/129,715

(22) PCT Filed: Nov. 16, 2009

(86) PCT No.: PCT/GB2009/051545
§ 371 (c)(1),
(2), (4) Date: Aug. 10, 2011

(87) PCT Pub. No.: WO2010/055354
PCT Pub. Date: May 20, 2010

(65) Prior Publication Data
US 2011/0303787 A1  Dec. 15, 2011

(30) Foreign Application Priority Data

Nov. 17, 2008 (GB) .................................. 0821009.8

(51) Int. Cl.
*G01M 5/00* (2006.01)
(52) U.S. Cl.
USPC ............................................ 73/802; 737/760
(58) Field of Classification Search
USPC .................... 73/760, 802, 774, 855
See application file for complete search history.

(56) References Cited

U.S. PATENT DOCUMENTS

| 3,752,462 A | 8/1973 | Wright, Jr. |
| 4,392,623 A | 7/1983 | Munsen et al. |
| 4,841,987 A * | 6/1989 | Brown et al. ................ 600/590 |
| 5,708,236 A | 1/1998 | Shaanan et al. |
| 5,927,646 A | 7/1999 | Sandy et al. |
| 8,033,181 B2 * | 10/2011 | Kibblewhite et al. ........... 73/761 |
| 2003/0057318 A1 | 3/2003 | Struzik et al. |

(Continued)

FOREIGN PATENT DOCUMENTS

| CN | 1152955 A | 6/1997 |
| CN | 201259429 Y | 6/2009 |

(Continued)

OTHER PUBLICATIONS

Chinese Patent Application No. 200980146740.3, Notice on the First Office Action, Date: Mar. 28, 2013, 12 pages.

(Continued)

*Primary Examiner* — Max Noori
(74) *Attorney, Agent, or Firm* — Hunton & Williams LLP

(57) ABSTRACT

An overload detecting assembly comprising a lateral probe (18) which cooperates with a first load bearing member (10) as it moves towards a second load bearing member (11) and in turn deflects an indicator member (20) which may take a permanent set when a yield point is exceeded. Ready inspection of the indicator member reveals whether or not it has been bent. The indicator member may comprise a cantilevered beam (24) formed in a sleeve (20) coaxial with the load bearing members (10, 11). Alternatively, an extension (25) of the probe (18) may deflect laterally at a midpoint under overload conditions. Alternatively, the probe (18) may form an impression in an indicator member (30) under overload conditions.

30 Claims, 4 Drawing Sheets

(56) References Cited

U.S. PATENT DOCUMENTS

| | | | |
|---|---|---|---|
| 2005/0093277 | A1 | 5/2005 | Schubert |
| 2007/0276292 | A1* | 11/2007 | Hansma et al. ............... 600/587 |
| 2010/0257923 | A1* | 10/2010 | Bennett ...................... 73/117.03 |
| 2011/0180360 | A1 | 7/2011 | Martin et al. |

FOREIGN PATENT DOCUMENTS

| | | |
|---|---|---|
| DE | 33 04 289 | 8/1984 |
| DE | 3304289 | 8/1984 |
| EP | 1831654 | 9/2007 |
| GB | 1338589 | 11/1973 |
| GB | 1 452 705 | 10/1976 |
| GB | 1452705 | 10/1976 |
| GB | 2228548 | 8/1990 |
| GB | 2452939 | 3/2009 |
| RU | 1107464 | 6/1995 |
| SU | 894448 | 12/1981 |
| SU | 1097539 | 6/1984 |
| WO | 82/02179 | 7/1982 |
| WO | WO 82/02179 | 7/1982 |

OTHER PUBLICATIONS

Russian Examination Report, Russian Application No. 2011122270/28, Nov. 26, 2013, 7 pages.

United Kingdom Search Report, United Kingdom Application No. GB0821009.8, Feb. 25, 2009, 3 pages.

Combined Search Report and Examination Report Under Sections 17 & 18(3), United Kingdom Application No. GB1222957.1, Jan. 24, 2013, 4 pages.

International Search Report and Written Opinion, International Application No. PCT/GB2009/051545, Sep. 27, 2010, 16 pages.

The State Intellectual Property Office of the People's Republic of China, Notice on the First Office Action, Mar. 25, 2014, 16 pgs. (includes translation of Chinese Office Action).

The State Intellectual Property Office of the People's Republic of China, Chinese Patent Application No. 201210499759.X, Notice on the First Office Action, Feb. 26, 2014, 8 pgs.

* cited by examiner

LOAD INDICATOR

TECHNICAL FIELD

This invention relates to a load indicator and especially an overload detecting assembly suitable for use in a load bearing application such as the landing gear of aircraft to monitor landing loads.

It is known to provide hard landing indicators in aircraft landing gear to support appropriate maintenance and repair regimes. A landing gear will typically comprise a shock absorber strut carrying a landing wheel assembly at its lower end and a pair of side stays connected between the strut and the aircraft fuselage. It is appreciated that loading of the side stays can be taken as an indicator of a hard landing or other adverse operating conditions. It has therefore been proposed to adapt a load bearing connector pin of a strut so that it gives an indication if it has experienced overload conditions.

An object of the invention is to provide an improved apparatus for indicating the occurrence of an overload condition in aircraft landing gear.

DISCLOSURE OF THE INVENTION

According to one aspect, the invention provides a load indicator comprising a cantilevered beam adapted to be engaged laterally by a probe that is responsive to a load condition and deflects the beam to give an indication of the load condition.

According to another aspect, the invention provides a load indicator comprising a probe adapted to be responsive to a load condition and to slide axially within a guide, and a display member which extends axially from the probe and is constrained axially at its distal end so that it is deflected laterally by axially movement of the probe.

According to yet another aspect, the invention provides a load indicator comprising a probe adapted to be responsive to a load condition and to slide axially within a guide, and an impressionable member which is located to be impacted by the probe when it slides axially so as to record the impact as an impression in its surface for subsequent inspection.

The load indicator may be incorporated in an overload detecting assembly comprising a first load bearing member adapted to be loaded laterally and to flex laterally in response to a load to be monitored, and which cooperates with the probe; and a second load bearing member orientated relative to the first load bearing member so as to be spaced therefrom under normal load conditions and to be contacted by and loaded by the first load bearing member when the latter is loaded laterally beyond a load limit, the first load bearing member thereafter transferring additional load to the second load bearing member.

In one embodiment, the first load bearing member has a yield point set below the load limit and takes a permanent deflected set once the yield point has been exceeded. The yield point may occur before the first and second load bearing members engage, or when they engage. The indicator member is then maintained by the first load bearing member in an operated state.

In an alternative embodiment of the invention, in which the first load bearing member may or may not reach a yield point, the assembly includes a load indicator having a yield point which when exceeded by contact with the probe takes a permanent set. This can happen either before the load bearing members engage or when they engage. Simple inspection of the central bore of the second load bearing member then reveals whether or not the indicator member has been operated, irrespective of whether or not the first load bearing member has taken a permanent set.

Preferably, the first load bearing member comprises a tubular member that receives the second load bearing member within it so that the two members engage via lands or bushes at opposite ends and are spaced apart in a central region to allow flexing of the first load bearing member relative to the second load bearing member under load. Both load bearing members may comprise cylindrical members arranged concentrically.

In a preferred embodiment in which the indicator member comprises a beam 24, the beam is formed in a cylindrical member located within the bore of the second load bearing member and is engaged by the probe passing through an aperture in the second load bearing member. The probe may comprise a pin or ball bearing mounted in said aperture between the first load bearing member and the beam 24 so as to transfer flexing of the first load bearing member to the beam 24. Clearance may be provided to accommodate small movements of the probe without causing movement of the beam.

DESCRIPTION OF THE DRAWINGS

The invention will now be described by way of example with reference to the accompanying drawings.

EMBODIMENTS OF THE INVENTION

Figure 1:
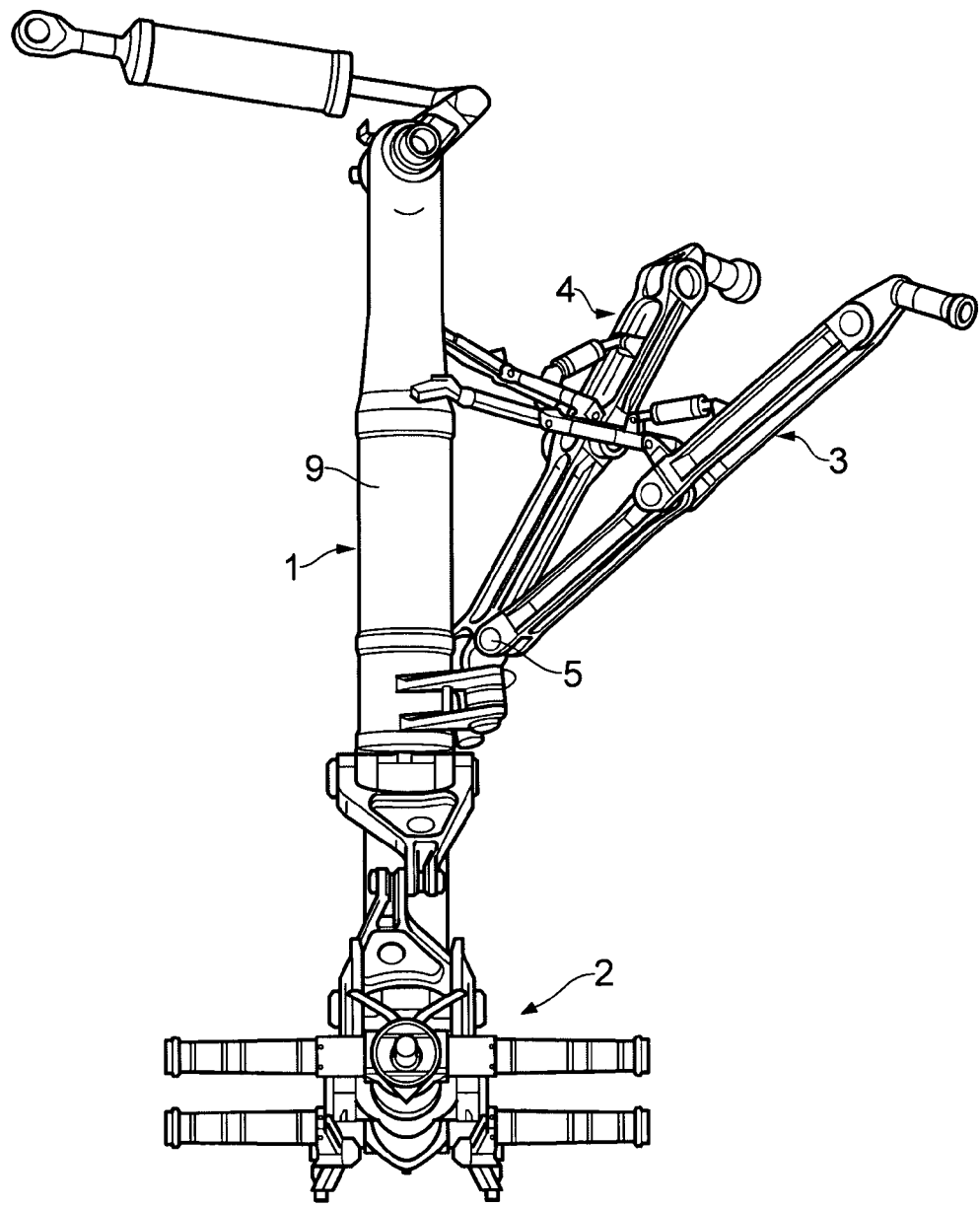
FIG. 1 is a schematic drawing of an aircraft landing gear.

FIG. 1 shows a landing gear assembly comprising a shock absorber strut 1 pivotally connected to a landing gear bogie 2 at its lower end and which is adapted to be connected to the fuselage of an aircraft at its upper end so that it can be deployed for landing or retracted into a storage bay in the fuselage. A pair of side stays 3, 4 are connected between the outer casing 9 of the strut 1 and the fuselage and serve to stabilise the position of the strut in operation. In combination, the stays react fore and aft loads and side loads. Each side stay is connected to the casing 9 of the strut via a pivot pin 5 and is pivotally connected to the fuselage at its remote end so as to fold with the landing gear when deployed or stowed. In operation, the side stays 3, 4 bear loads related to the load applied to the landing gear assembly and therefore loading of a stay is indicative of landing loads. The invention provides an overload indicator which is responsive to the load in a side stay. This overload indicator is incorporated in the pivot pin 5 connecting the lower end of a side stay to the casing 9 of the shock absorber strut 1.

Figure 2:
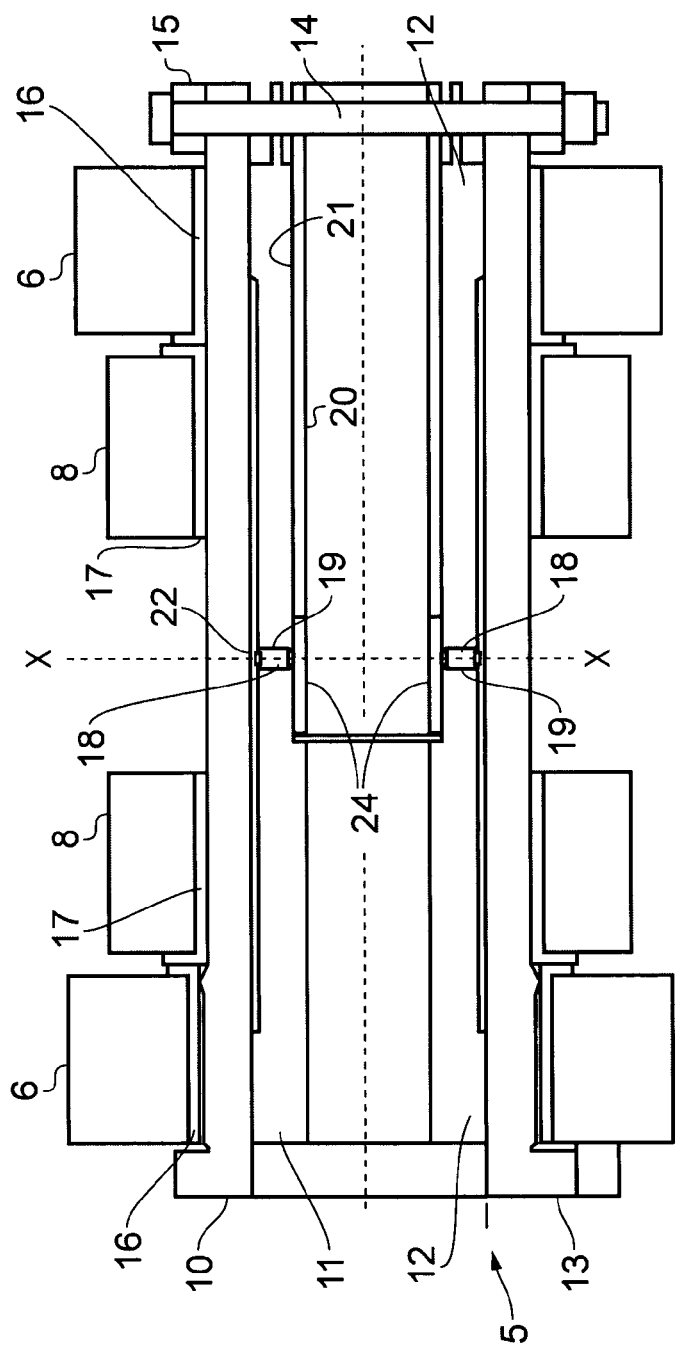
FIG. 2 is an axial section of a pivot pin according to the invention in its non-loaded condition.

FIG. 2 shows a pivot pin 5 incorporating the invention and fitted between a pair of lugs 6 of a shackle connected to the strut casing 9 and a pair of lugs 8 and of a shackle at the lower end of the side stay 3. The pivot pin comprises an outer cylindrical load bearing member 10 arranged concentrically with an inner cylindrical load bearing member 11. The two load bearing members engage at opposite ends via lands 12 and the inner load bearing member 11 has a reduced thickness therebetween in its central region so as to create a separation between the surfaces of the two load bearing members. The pivot pin 5 is inserted through apertures in the lugs 6 and 8. A radially extending flange 13 formed on one end of the outer load bearing member 10 abuts the outer side of one lug 6. A retaining bolt 14 at the opposite end from the flange 13 extends diametrically through both load bearing members 10, 11 and an outer retaining ring 15 to connect the load bearing members together and secure them axially. L-shaped spacer sleeves or bushes 16 are provided at each end between the lug 6 and the outer load bearing member 10. The lugs 6 are aligned with the lands 12. Spacer sleeves or bushes 17 are also provided between the lugs 8 and the outer load bearing member 10.

The pivot pin 5 also incorporates a pair of sensor pins 18 which are mounted in apertures 19 in the inner load bearing member 11 so as to extend radially on opposite sides of the centre-line of the pin generally along the longitudinal axis xx of the side stay 3. A load indicator 20 in the form of a sleeve is located within a shallow recess 21 in the bore of the inner load bearing member 11 and is connected to the pin 5 at its outer end by the retaining bolt 14. The sleeve 20 is such that in its non-activated state it lies fully within the recess 21 and is flush with the bore of the inner load bearing member 11. The axial length of each pin 18 is such that a small clearance 22 is provided between the ends of the pin 18 and the indicator sleeve 20 and outer load bearing member 10.

Figure 6:
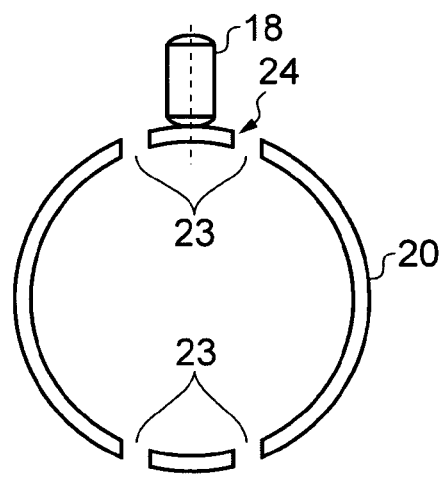
FIG. 6 is a radial cross-section of the pivot pin of FIG. 2.

As shown in FIG. 6, the indicator sleeve 20 is formed with two pairs of parallel slots 23 diametrically opposite one another that extend from the inner end of the sleeve to form a cantilevered beam 24 therebetween, in central alignment with a pin 18. Each beam 24 extends just beyond the pin 18 so that the majority of the beam extends from the point of contact with the pin 18 to its free inner end. Because of this geometry, deflection of the beam 24 caused by inwards movement of the pin 18 will generate a larger deflection at the free end of the beam compared with the actual movement of the pin. Movement of the outer bearing member 10 caused by an overload condition will therefore be amplified by the indicator beam 24 and result in a clearer visual indication of the overload condition.

Figure 3:
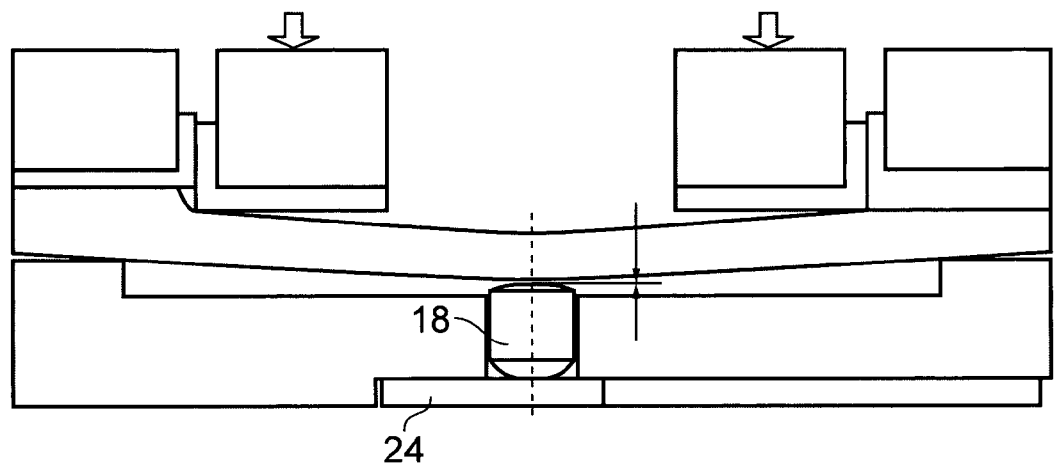
FIG. 3 is an axial section of the pivot pin of FIG. 1 in a lightly loaded condition.

In operation, as a load (compression or tension) is applied to the side stay 3, this is applied to the pivot pin 5 and causes the outer load bearing member 10 to flex, as shown in FIG. 3. Under light load conditions below a yield point, the outer load bearing member does not take a permanent set when deflected and returns to its normal cylindrical shape once the load is removed by virtue of its resilient material properties. As shown in FIG. 3, the extent of the flexing of the outer load bearing member is such as to engage one of the sensor pins 18 and to push it into the aperture 19 to close the clearance 22. At this stage, the sensor pin 18 may engage the beam 24 but does not deflect it. Further deflection of the outer load bearing member 10 under increased load causes the sensor pin 18 to deflect the beam 24 inwardly, but the beam 24 does not take a permanent set until a yield point defined by the indicator material is reached. Therefore, if the applied load is reduced, the beam 24 returns to its normal position by virtue of its own resilient material properties.

Figure 4:
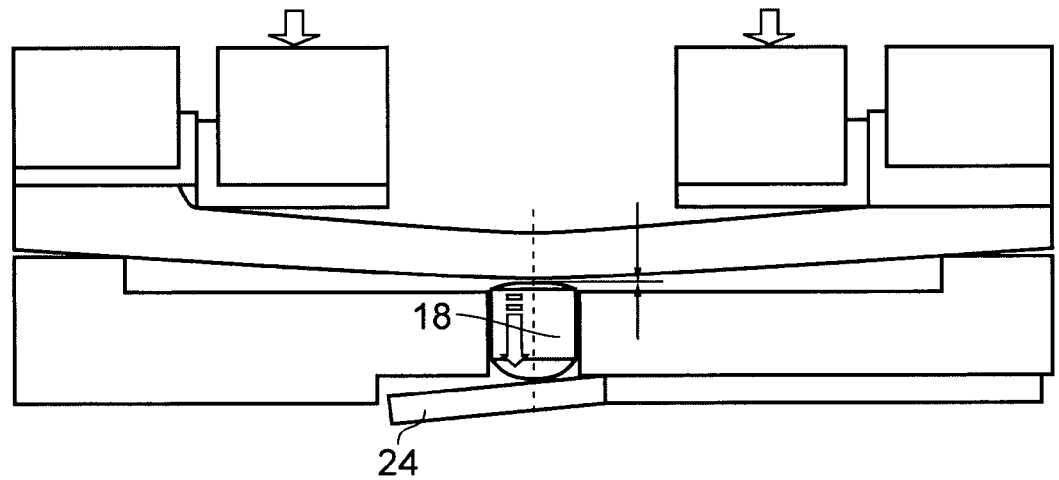
FIG. 4 is an axial section of the pivot pin of FIG. 1 in a loaded condition that operates an indicator.

Under overload conditions, once the compression load exceeds an indicator threshold, the outer load bearing member 10 is deflected to such an extent as to displace the sensor pin 18 and beam 24 so that one of the yield points of the outer load bearing member 10 or beam 24 is exceeded, whereupon the beam 24 does not return to its normal position once the load is reduced below the indicator threshold. If the yield point of the outer load bearing member 10 is exceeded, it takes a permanent set and serves to hold the sensor pin 18 and beam 24 in the projecting state shown in FIG. 4. It therefore does not matter whether the beam 24 has exceeded its own yield point itself because it is not free to return to its normal position. In an alternative embodiment of the invention, the beam 24 is arranged to be deflected beyond its yield point when the indicator load is exceeded, and it does not then matter if the outer load bearing member 10 has not exceeded its yield point and returns to its normal position when the applied load is removed. Therefore, in each of these embodiments, the beam 24 is permanently displaced inwardly of the central bore of the inner load bearing member 11 once the indicator load has been applied or exceeded, and this serves as an indication of an overload event for maintenance or service personnel who are able to check by inspection of the bore of the inner load bearing member. Inspection may be visual inspection or tactile inspection using for example a gauge to detect deformation of the beam 24.

Figure 5:
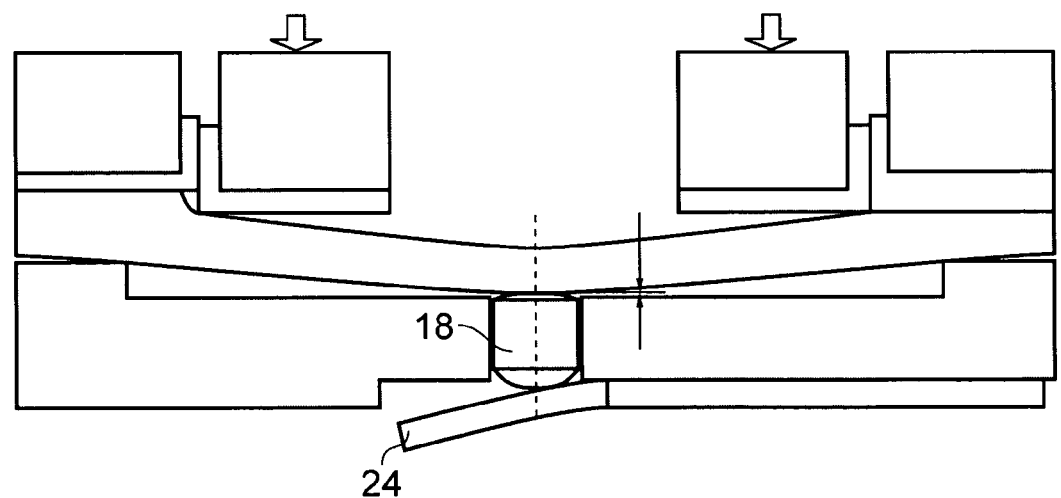
FIG. 5 is an axial section of the pivot pin in FIG. 1 in a more fully loaded condition than in FIG. 4.

If the compression load applied to the side stay 3 is increased beyond the indicator load, then the outer load bearing member 10 will continue to flex and will eventually close the gap with the inner load bearing member 11 to engage the latter, as shown in FIG. 5. Any further increase in load will then be transferred to the inner load bearing member. The inner load bearing member can be made as strong as required to match the loads for which the apparatus is designed.

Whilst the operation of the pivot pin 5 has been described above by reference to a compression load which operates one of the two aligned sensor pins 18, it will be appreciated that a tension load applied to the side stay 3 will cause the outer load bearing member 10 to flex in the opposite direction and operate the other of the two sensor pins 18.

Once the beam 24 has been operated, the pivot pin 5 may be serviced to reset it. This is done by removing the bolt 14 and withdrawing the pivot pin 5 from the assembly, as shown in FIG. 6. The whole pivot pin assembly can then either be replaced or the indicator sleeve 20 and outer load bearing pin 10 can be replaced.

Figures 7A, 7B:
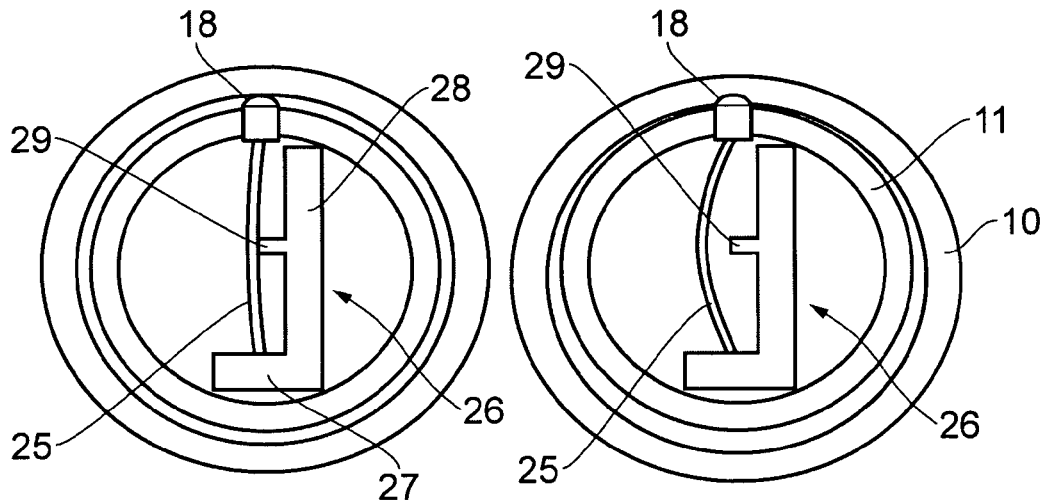
FIG. 7A and FIG. 7B are radial cross-sections of an alternative embodiment of the invention.

FIGS. 7A and 7B illustrate an embodiment of the invention in which instead of the indicator sleeve 20 of FIGS. 1 to 5, a sensor pin 18 is formed with an elongate extension 25 that extends radially across the bore of the inner load bearing member 11. A support member 26 is located within the bore of the load bearing member 11 and is generally L-shaped with a foot 27 that seats against the inner surface of the bore opposite the pin 18 and against which the free end of the extension 25 engages. A leg portion 28 of support member 26 extends alongside the extension 25 and is formed with a projection 29 in its mid region that extends towards the extension 25 and just touches when the latter is in its non-operated state shown in FIG. 7A. Under an overload condition, the pin 18 is displaced inwards and causes the extension 25 to deflect laterally, as shown in FIG. 7B. This deflection is made visually more noticeable by the gap that then opens up between the extension 25 and the projection 29.

Figure 8:
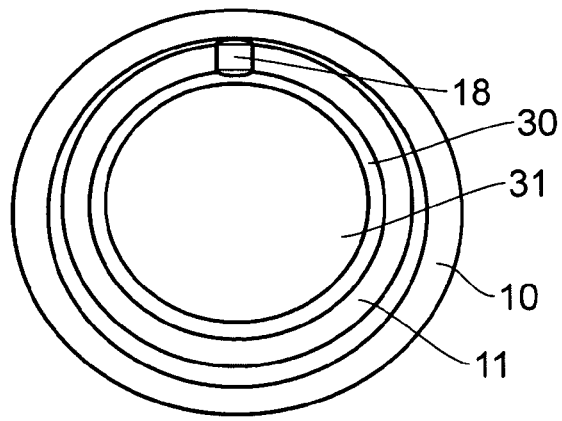
FIG. 8 is a radial cross-section of another alternative embodiment of the invention.

FIG. 8 illustrates yet another embodiment of the invention in which the indicator sleeve 20 of FIGS. 1 to 6 is replaced by an impressionable member within the bore of the inner load bearing member 11 that is adapted to record an impact of the pin 18 under overload conditions in the form of a depression, which can be inspected once the impressionable member us withdrawn from the bore of the inner load bearing member 11. As shown in FIG. 8, the impressionable member takes the form of a sleeve 30 with an inner anvil member 31 that supports the inner surface of the sleeve 30 to resist radial flexing and maximise the impression formed therein under overload conditions. In alternative embodiments, the impressionable member may be non-cylindrical and be supported on a non-cylindrical anvil member, for example, a block of material.

It will be appreciated that more than two sensor pins 18 may be provided spaced angularly around the pin 5, and that the angular alignment of the pin 5 relative to the side stay 3 is then less important because at least one sensor pin 18 would always be aligned generally with the line of action of the side stay. In another embodiment of the invention, the pin 5 may even be left free to rotate within the lugs 6, 8.

The invention claimed is:

1. An overload detection assembly comprising:
   a first load bearing member that flexes in response to a load condition to be monitored;
   a probe that cooperates with the first load bearing member to be responsive to the load condition;
   a load indicator comprising a cantilevered beam adapted to be engaged laterally by the probe such that the probe deflects the beam from a first position to give an indication of the load condition, the load indicator being arranged such that under an overload condition the beam does not return to the first position.

2. An overload detection assembly as recited in claim 1, wherein the beam is formed in a cylindrical member adapted to be received in an assembly in alignment with the probe.

3. An overload detection assembly as recited in claim 2, wherein the beam is formed by longitudinally extending slots in the cylindrical member with the beam between them.

4. An overload detection assembly as recited in claim 1, wherein the beam has a yield point which when exceeded during deflection by the probe under an overload condition, takes a permanent set.

5. An overload detection assembly as recited in claim 1, wherein the first load bearing member flexes laterally in response to a load to be monitored.

6. An overload detection assembly as recited in claim 5 comprising a second load bearing member orientated relative to the first load bearing member so as to be spaced therefrom under normal load conditions and to be contacted by and loaded by the first load bearing member when the first load bearing member is loaded laterally beyond a load limit, the first load bearing member thereafter transferring additional load to the second load bearing member.

7. An overload detection assembly as recited in claim 6, wherein the first load bearing member has a yield point set below the load limit and takes a permanent deflected set once the yield point has been exceeded.

8. An overload detection assembly as recited in claim 6, wherein the yield point is reached either before the first and second load bearing members engage, or when they engage.

9. An overload detection, assembly as recited in claim 8, wherein the beam takes a lateral set either before the load bearing members engage or when they engage.

10. An overload detection assembly as recited in claim 6, wherein the beam is held in a deflected position by the probe due to a permanent set of the first load bearing member.

11. An overload detection assembly as recited in claim 6, wherein the first load bearing member comprises a tubular member that receives the second load bearing member within it so that the two members engage via lands at opposite ends and are spaced apart in a central region to allow flexing of the first load bearing member relative to the second load bearing member under load.

12. An overload detection assembly as recited in claim 11, wherein both load bearing members are cylindrical and are arranged concentrically.

13. An overload detection assembly as recited in claim 11, wherein the cylindrical member incorporating the beam is located within the bore of the second load bearing member and engaged by the probe passing through an aperture in the second load hearing member.

14. An overload detection assembly as recited in claim 13, wherein the cylindrical member extends to one end of the second load bearing member so as to be readily accessible to be withdrawn for inspection or replacement.

15. As overload detection assembly as recited in claim 14, wherein the cylindrical member is connected to said the first and second load bearing members at the one end so that it is secured in an angular orientation in which the beam is aligned with the probe.

16. An overload detection assembly as recited in claim 13, wherein the probe is mounted in the aperture between the first load bearing member and the beam so as to transfer flexing of the first load, bearing member to the beam.

17. An overload detection assembly as recited in claim 16 in which a clearance is provided to accommodate small movements of the probe without causing movement of the beam under loads not reaching the load condition.

18. An overload detection assembly as recited in claim 14, wherein multiple additional probes are arranged in circumferentially spaced locations around the cylindrical member, each engaging a respective cantilevered beam in the cylindrical member.

19. An overload detection assembly as recited in claim 6, wherein the probe comprises a pin or a spherical member.

20. An overload detection assembly as recited in claim 6, further comprising a radial flange connected to the second load bearing member and adapted to axially abut a side of one of two components to be connected together by insertion of the assembled load bearing members into apertures in the two components.

21. A load indicator comprising:
   a pivot pin;
   indicating means for indicating when the pivot pin has exceeded a predetermined load, the means comprising
      a probe configured to be responsive to a load condition and to slide axially within a guide under the to condition and
      a display member that extends axially from the probe and is constrained axially at its distal end so that it is deflected laterally by axial movement of the probe; and
   a support member that constrains the distal end of the display member and has a portion fixed adjacent to an intermediate region of the display member to serve as a visual datum for deflection of the display member.

22. A load indicator as recited in claim 21, wherein the support member has a portion that extends generally alongside the display member.

23. A load indicator as recited in claim 21, wherein the means for indicating comprises an impressionable member located to be impacted by the probe when it slides axially so as to record the load condition by an impression in a surface of the impressionable member.

24. A load indicator as recited in claim 21, wherein the pivot pin comprises a first load bearing member that flexes laterally in response to a load to be monitored and that causes the probe to slide axially within the guide under the load condition.

25. A load indicator as recited in claim 24, wherein the pivot pin further comprises a second load bearing member orientated relative to the first load bearing member so as to be spaced therefrom under normal load conditions and to be contacted by and loaded by the first load bearing member when the latter is loaded laterally beyond a load limit, the first load bearing member thereafter transferring additional load to the second load bearing member.

26. A load indicator as recited in claim 25, further comprising an indicator member located within the bore of the second load bearing member, the probe passing through an aperture in the second load bearing member to be in contact with the indicator member.

27. An aircraft landing gear assembly comprising:
a strut; and
at least one stay pivotally connected to the strut by a pivot pin;
wherein the pivot pin comprises a load indicator comprising a cantilevered beam adapted to be engaged laterally by a probe that is responsive to a load condition and deflects the beam from a first position to give art indication of the load condition, the load indicator being arranged such that under an overload condition the beam does not return to the first position.

28. An overload detection assembly as recited in claim 20, wherein the two components comprise an aircraft landing gear strut and an aircraft landing gear stay.

29. A load indicator comprising:
a pivot pin; and
indicating means for indicating when the pivot pin has exceeded a predetermined load, the means comprising a probe configured to be responsive to a load condition and to slide axially within a guide under the load condition,
wherein the means for indicating comprises an impressionable member located to be impacted by the probe when it slides axially so as to record the load condition by an impression in a surface of the impressionable member.

30. A load indicator comprising:
a pivot pin; and
indicating means for indicating when the pivot pin has exceeded a predetermined load, the means comprising a probe configured to be responsive to a load condition and to slide axially within a guide under the load condition,
wherein the pivot pin comprises
a first load bearing member that flexes laterally in response to a load to be monitored and that causes the probe to slide axially within the guide under the load condition and
a second load bearing member orientated relative to the first load bearing, member so as to be spaced therefrom under normal load conditions and to be contacted by and loaded by the first load bearing member when the latter is loaded laterally beyond a load limit, the first load bearing member thereafter transferring additional load to the second load bearing member.

* * * * *

UNITED STATES PATENT AND TRADEMARK OFFICE
CERTIFICATE OF CORRECTION

PATENT NO.       : 8,800,382 B2
APPLICATION NO.  : 13/129715
DATED            : August 12, 2014
INVENTOR(S)      : Ian Robert Bennett Page 1 of 1

It is certified that error appears in the above-identified patent and that said Letters Patent is hereby corrected as shown below:

In the Claims

In claim 13, col. 6, line 8, delete "hearing" and insert --bearing--.

In claim 15, col. 6, line 13, delete "As" and insert --An--.

Signed and Sealed this
Twenty-fifth Day of November, 2014

Michelle K. Lee
*Deputy Director of the United States Patent and Trademark Office*